(12) United States Patent
Howell

(10) Patent No.: US 8,476,367 B1
(45) Date of Patent: Jul. 2, 2013

(54) PELLETIZED PLASTIC COMPOUNDS AND METHOD OF MANUFACTURE

(75) Inventor: George D. Howell, Arlington, TX (US)

(73) Assignee: Spartech Corporation, St. Louis, MO (US)

( * ) Notice: Subject to any disclaimer, the term of this patent is extended or adjusted under 35 U.S.C. 154(b) by 0 days.

(21) Appl. No.: 13/017,317

(22) Filed: Jan. 31, 2011

(51) Int. Cl.
*C08L 53/00* (2006.01)

(52) U.S. Cl.
USPC .................... 525/95; 525/97; 264/5; 264/148

(58) Field of Classification Search
USPC .............................. 525/93, 95, 97; 264/5, 148
See application file for complete search history.

(56) References Cited

U.S. PATENT DOCUMENTS

| | | | |
|---|---|---|---|
| 4,687,804 A | 8/1987 | Shiraishi et al. | |
| 7,105,604 B2 | 9/2006 | Shimizu et al. | |
| 2006/0199910 A1 | 9/2006 | Walton et al. | |
| 2006/0211819 A1 | 9/2006 | Hoenig et al. | |
| 2007/0077375 A1 | 4/2007 | Honda et al. | |
| 2007/0122570 A1 | 5/2007 | Honda et al. | |
| 2009/0105374 A1 | 4/2009 | Wu et al. | |
| 2010/0029827 A1* | 2/2010 | Ansems et al. | 524/451 |
| 2010/0071795 A1 | 3/2010 | Montalvo et al. | |
| 2010/0113698 A1 | 5/2010 | Walton et al. | |
| 2011/0082258 A1* | 4/2011 | Walton et al. | 525/89 |

* cited by examiner

*Primary Examiner* — Jeffrey Mullis
(74) *Attorney, Agent, or Firm* — Armstrong Teasdale, LLP

(57) ABSTRACT

A pellet is formed by a method includes, in one embodiment, dispersing up to about 95% by weight of thermoset rubber particles into a carrier resin to form the plastic compound. The carrier resin includes an olefin block copolymer. The method also includes the steps of extruding the plastic compound through a die having at least one die hole to form at least one extrudate filament, cutting the at least one extrudate filament to a predetermined length to form a plurality of pellets, conveying the pellets to a separator/centrifugal dryer in water having a temperature of about 170° F. or greater, and separating the pellets from the water in the separator/centrifugal dryer so that the pellets are substantially dry upon removal from the separator/centrifugal dryer. The resultant pelletized plastic compound has a flex modulus of less than about 20,000 pounds per square inch (psi).

23 Claims, 2 Drawing Sheets

PELLETIZED PLASTIC COMPOUNDS AND METHOD OF MANUFACTURE

BACKGROUND OF THE INVENTION

The field of the invention relates generally to pelletized plastic compounds, and more particularly to pelletized plastic compounds and method of manufacture that does not include multiple drying steps.

Some known pelletizing devices used to pelletize plastic compounds utilize water to cool the formed pellets and convey the pellets to a spin-dryer/separator. One of the problems with these devices, and certain plastics, is that the die used to make the pellets may cause surface roughness on the surface of the pellets. This roughness tends to hold water on the surface, and the pellets remain wet after exiting the separator/spin-dryer. To overcome this problem an additional drying step to remove the water from the surface of the pellets can be used. However, drying steps are expensive and lengthen the manufacturing time.

Another method of overcoming the wet pellet surface is to use water at an increased temperature so that the heat of the pellets will evaporate the water when the water is separated from the conveying water. However, when manufacturing pellets that have a low flex modulus, for example about 20,000 pounds per square inch (psi) or less, water at a temperature that is high enough to drive the water from the surface of the pellets will melt the low modulus plastic material. The melted plastic pellets can clog the separator/spin-dryer causing manufacturing stoppage to clean the spin-dryer/separator.

BRIEF DESCRIPTION OF THE INVENTION

In one aspect, a pellet is provided. The pellet is formed by a method including the steps of dispersing up to about 95% by weight of thermoset rubber particles into a carrier resin to form the plastic compound, the weight percent based on the total weight of the plastic compound. The carrier resin includes an olefin block copolymer. The method also includes the steps of extruding the plastic compound through a die having at least one die hole to form at least one extrudate filament, cutting the at least one extrudate filament to a predetermined length to form a plurality of pellets, conveying the pellets to a separator/centrifugal dryer in water having a temperature of about 170° F. or greater, and separating the pellets from the water in the separator/centrifugal dryer so that the pellets are substantially dry upon removal from the separator/centrifugal dryer. The resultant pelletized plastic compound has a flex modulus of less than about 20,000 pounds per square inch (psi).

In another aspect, a method of pelletizing a plastic compound is provided. The method includes dispersing up to about 95% weight of thermoset rubber particles into a carrier resin to form the plastic compound, the weight percent based on the total weight of the plastic compound. The carrier resin includes an olefin block copolymer. The method also includes extruding the plastic compound through a die having at least one die hole to form at least one extrudate filament, cutting the at least one extrudate filament to a predetermined length to form a plurality of pellets, conveying the pellets to a separator/centrifugal dryer in water having a temperature of about 170° F. or greater, and separating the pellets from the water in the separator/centrifugal dryer so that the pellets are substantially dry upon removal from the separator/centrifugal dryer. The resultant pelletized plastic compound has a flex modulus of less than about 20,000 psi.

In another aspect, a pellet is provided. The pellet is formed by a method including the steps of mixing up to about 95% by weight of thermoset rubber particles and a carrier resin together to form a plastic compound, the weight percent based on the total weight of the plastic compound. The carrier resin includes an olefin block copolymer. The method also includes the steps of directing the plastic compound into a pelletizer apparatus comprising a die and a knife blade, extruding the plastic compound through the die to form an extrudate, cutting the extrudate with the knife blade to form pellets of the plastic compound, conveying the pellets to a separator/centrifugal dryer by a stream of water having a temperature of about 170° F. or greater, and separating the pellets from the water in the separator/centrifugal dryer, where the pellets are substantially dry upon removal from the separator/centrifugal dryer. The resultant pelletized plastic compound has a flex modulus of less than about 20,000 psi.

In another aspect, a method of pelletizing a plastic compound is provided. The method includes mixing up to about 95% by weight of thermoset rubber particles and a carrier resin together to form a plastic compound, the weight percent based on the total weight of the plastic compound. The carrier resin includes an olefin block copolymer. The method also includes directing the plastic compound into a pelletizer apparatus comprising a die and a knife blade, extruding the plastic compound through the die to form an extrudate, cutting the extrudate with the knife blade to form pellets of the plastic compound, conveying the pellets to a separator/centrifugal dryer by a stream of water having a temperature of about 170° F. or greater; and separating the pellets from the water in the separator/centrifugal dryer, where the pellets are substantially dry upon removal from the separator/centrifugal dryer. The resultant pelletized plastic compound has a flex modulus of less than about 20,000 psi.

In another aspect, a pelletized plastic compound is provided. The pelletized plastic compound including up to about 95% by weight of thermoset rubber particles dispersed into a carrier resin, the weight percent based on the total weight of the plastic compound. The carrier resin includes an olefin block copolymer, and the pelletized plastic compound has a flex modulus less than about 20,000 psi.

DETAILED DESCRIPTION OF THE INVENTION

A pelletized plastic compound and method of manufacturing the plastic pellets are described below in detail. The pelletized plastic compound has a low flex modulus, less than about 20,000 psi, and includes a carrier resin that includes an olefin block copolymer, and optionally, thermoset rubber particles dispersed in the carrier resin. The pelletized plastic compound has a melting temperature of about 200° F. to about 300° F. which facilitates the use of process water that has a temperature of greater than about 170° F. In one exemplary embodiment the process water has a temperature of about 170° F. to about 200° F. The temperature of the process water is higher than the temperature of process water in known pelletizing processes which facilitates the drying of the pellets in a separator/centrifugal dryer without the use of additional drying steps in the pelletizing process.

In one exemplary embodiment, the plastic compound is a dispersion of thermoset rubber particles in a carrier resin. Suitable thermoset rubber particles include, but are not limited to, ethylene-propylene-diene monomer (EPDM) rubber particles, and neoprene rubber particles. The thermoset rubber particles have a particle size, in one embodiment, less than about 0.420 mm, and in another embodiment, from about 0.177 mm to about 0.420 mm.

The carrier resin may be a thermoplastic resin that has a low flex modulus, that in one embodiment, is less than about 20,000 psi, in another embodiment, is less than about 12,000 psi, and in another embodiment, less than about 8,000 psi. Flex modulus is the ratio of stress to strain in flexural deformation, and is typically measured in accordance with ASTM D790 test method. In addition, the melting temperature of the carrier resin is in one embodiment, about 200° F. to about 300° F., and in another embodiment, about 225° F. to about 275° F. The carrier resin may be an olefin block copolymer, for example, an ethylene-1-octene block copolymer. Other olefin block copolymers having the flex modulus properties and melting temperature properties described above may also be used. The amount of the thermoset rubber particles in the plastic compound, in one embodiment, is 0% to about 95%, in another embodiment, is 0% to about 80%, in another embodiment, is about 30% to about 95% by weight, in another embodiment, is about 40% to about 90%, and in another embodiment, is about 50% to about 80% by weight, based on the total weight the plastic compound.

The plastic compound can be prepared by melt mixing the components with equipment known in the art. The equipment may include continuous and batch mixers, for example, Farrel Continuous Mixers available from Farrel Corporation, Ansonia, Conn., Banbury® mixers available from Farrel Corporation, single screw extruders, multiple screw extruders, and the like. Also, melt mixing of the plastic compound in a continuous process in-line with the production of the pellets may also be used.

Figure 1:
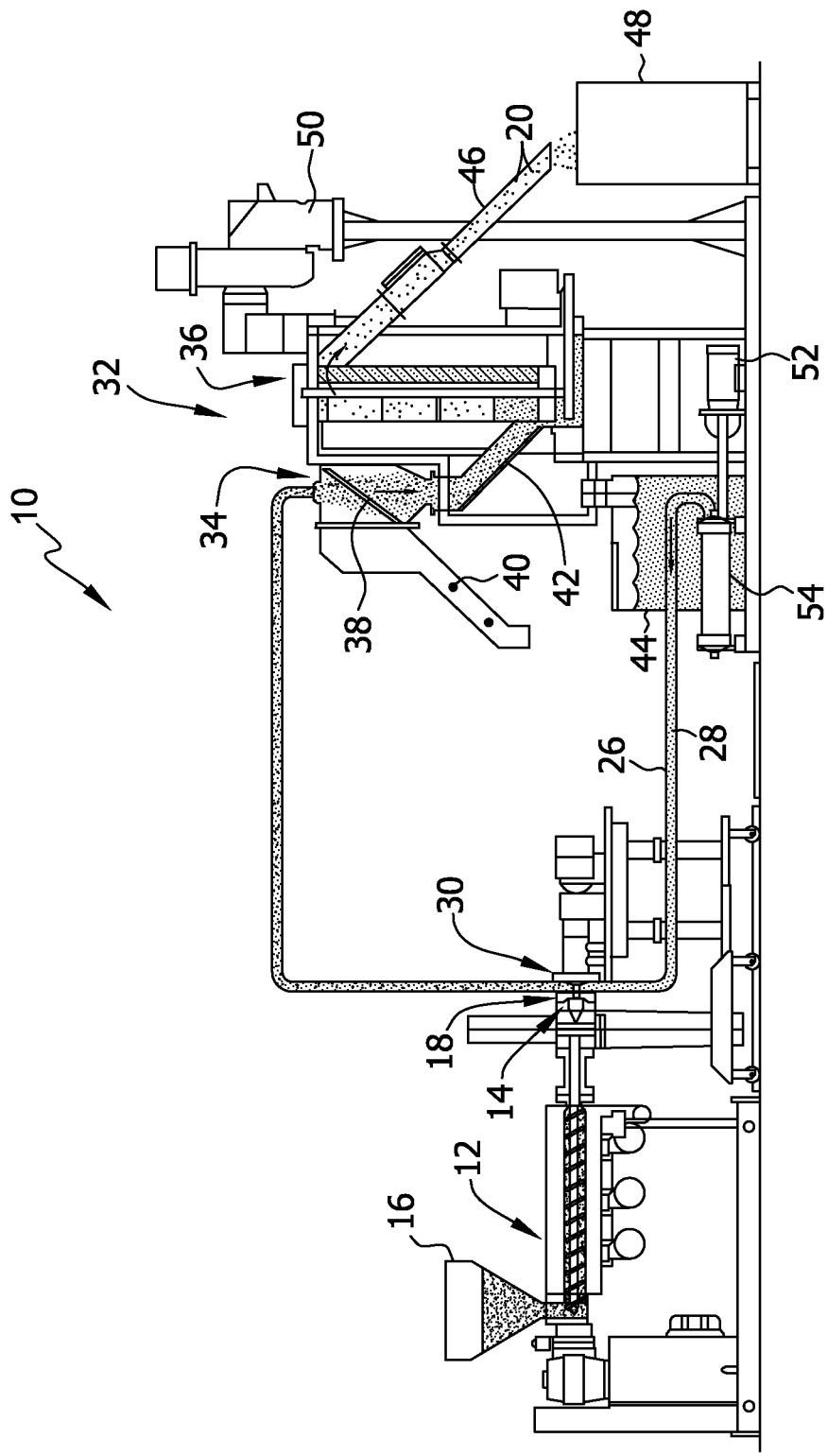
FIG. 1 is a schematic of a pelletizing apparatus.
Figure 2:
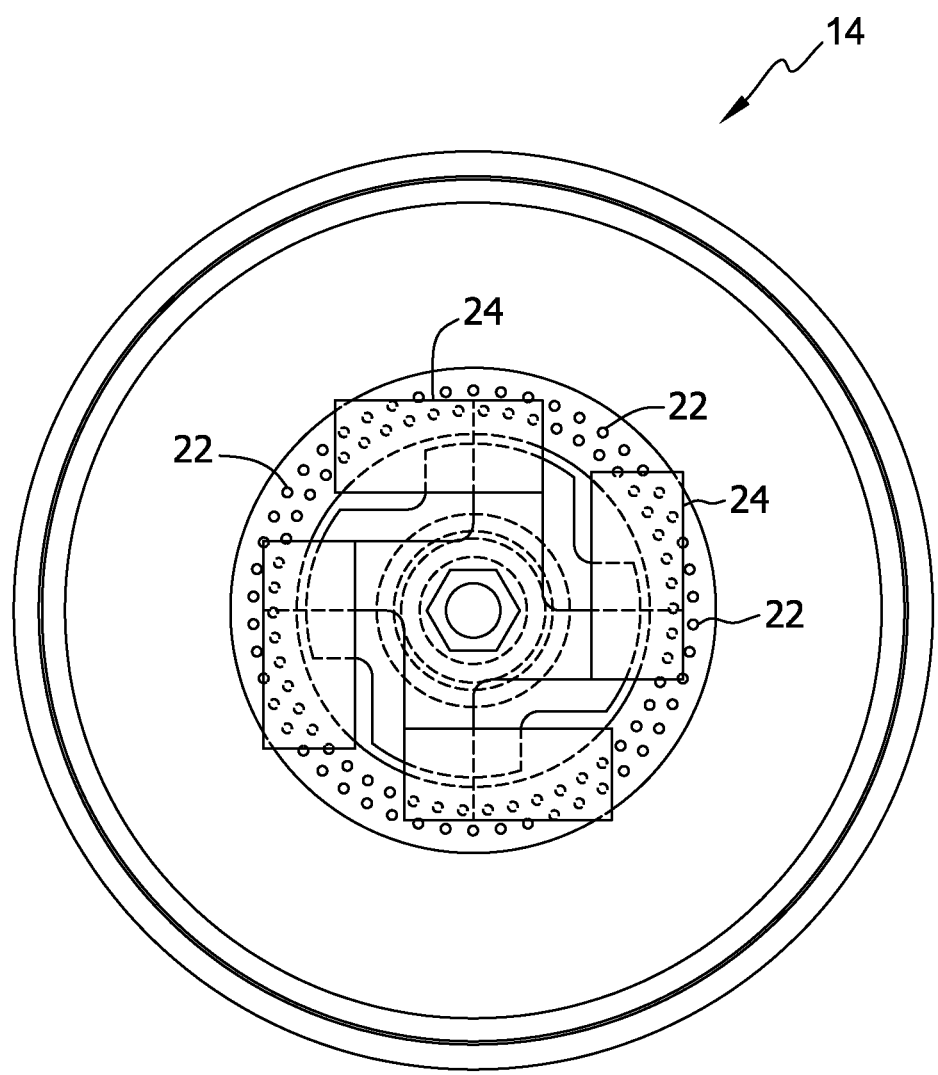
FIG. 2 is a schematic of a die shown in FIG. 1.

The plastic compound is pelletized using known waterborne commercial pelletizers, for example, underwater pelletizers available from Gala Industries, Inc., Eagle Rock Va., and Beringer water ring pelletizers available from Dynisco Instruments, Franklin, Mass., and inline water ring pelletizers available from Dynisco Instruments. Referring to the drawings, FIG. 1 is a schematic of an exemplary embodiment of a pelletizing apparatus 10 that includes an extruder 12 and a die 14 coupled to extruder 12. A feed hopper 16 is coupled to extruder 12 that feeds the ingredients of the plastic compound into extruder 12. A cutter 18 is positioned adjacent die 14 for cutting the extrudate filaments exiting die 14 to form pellets 20. Referring also to FIG. 2, die 14 includes die holes 22 and cutter 18 includes a plurality of knife blades 24. As the extrudate filaments exit die holes 22, knife blades 24 rotate and cut the extrudate filaments into pellets 20. The diameter of die holes 22 are sized for the desired thickness of pellets 20. In an exemplary embodiment, the diameter of die holes is about 0.060 inch to about 0.125 inch.

A water line 26 carries process water 28 to a cutting chamber 30 to cool and solidify pellets 20. Process water 28 also conveys pellets 20 to a separator/centrifugal dryer 32 to separate pellets 20 from process water 28 and to dry pellets 20. Separator/centrifugal dryer 32 has a separator portion 34 and a centrifugal dryer portion 36. Separator portion 34 includes a first screen 38 that permits pellets 20 and process water 28 to pass through while preventing any agglomerates 40 from passing through first screen 38. Agglomerates 40 are removed from separator portion. Agglomerates 40 may be recycled into extruder 12 for reprocessing. A second screen 42 is sized to prevent pellets 20 from passing through while permitting process water 28 to pass through. Process water 28 is collected in a tank 44 for recycling process water. Pellets 20 are directed to centrifugal dryer portion 36 where pellets 20 are spun dry. The spun dry pellets 20 are conveyed through a pipe 46 to a storage container 48. A blower 50 is coupled to pipe 46 to provide air for conveying pellets through pipe 46. A pump 52 is coupled to water line 26 to pump process water 28 through water line 26. A heater 54 is coupled to water line 26 and controls the temperature of process water 28.

In an exemplary embodiment, to make pellets 20, a plastic compound is prepared by melt mixing thermoset rubber particles and a carrier resin of an olefin block copolymer to disperse the rubber particles into the olefin block copolymer. The melt mixing is performed in known mixing equipment, for example, continuous and batch mixers, Banbury® mixers, single screw extruders, multiple screw extruders, and the like. Mixing temperatures utilized are at least as high as the melting temperature of the olefin block copolymer. In another embodiment, the carrier resin does not include dispersed rubber particles. The plastic compound is fed into pelletizing apparatus 10 and extruded through die 14. Specifically, the plastic compound is extruded through die holes 22 creating a filament of extrudate exiting each die hole 22. Knife blades 24 are rotated to cut each extrudate filament into pellets 20 having a predetermined length. In one embodiment pellets 20 are cut to a length of about 0.125 inch to about 0.5 inch. Pellets 20 are captured by process water 28 to cool and solidify pellets 20. To facilitate the drying of pellets 20, the temperature of process water 28 is about 170° F. or greater. In one embodiment, the temperature of process water is about 170° F. to about 200° F. Process water 28 conveys pellets 20 to separator/centrifugal dryer 32 to separate pellets 20 from process water 28 and to dry pellets 20. Pellets 20 are separated from process water 28 in separator portion 34 of separator/centrifugal dryer 32. Any residual water on the surface of pellets 20 is removed in centrifugal dryer portion 36. Upon exiting centrifugal dryer portion 36 of separator/centrifugal dryer 32, pellets 20 are substantially dry. Pellets 20 are then conveyed to a storage container.

The above describe pelletized plastic compound and the method of making the pelletized plastic compound facilitate the production of plastic pellets having substantially no water on the surfaces of the pellets. The plastic compound includes a olefin block copolymer that has a low flex modulus of less than about 20,000 psi and a melting temperature of about 200° F. to about 300° F. The high melting temperature of the olefin block copolymer permits the use of process water at a temperature of 170° F. or greater as compared to known pelletizing process that utilize process water of about 100° F. The higher process water temperature facilitates the removal of water from the surface of the pellets without added drying steps in the manufacturing process. Added process steps add costs and add processing time.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A pellet formed by a method comprising the steps of:
  dispersing from about 30% to about 95% by weight of thermoset rubber particles into a carrier resin to form a plastic compound, weight percent based on the total weight of the plastic compound, the carrier resin comprising an olefin block copolymer, wherein the olefin block copolymer comprises an ethylene-1-octene block copolymer and is present in the plastic compound in an amount of from about 5% to about 70% by weight based on the total weight of the plastic compound;

extruding the plastic compound through a die having at least one die hole to form at least one extrudate filament;

cutting the at least one extrudate filament to a predetermined length to form at least one pellet;

conveying the at least one pellet in water to a separator/centrifugal dryer, the water having a temperature of about 170° F. or greater; and separating the at least one pellet from the water in the separator/centrifugal dryer, the at least one pellet substantially dry upon removal from the separator/centrifugal dryer, the pelletized plastic compound having a flex modulus of less than about 20,000 pounds per square inch (psi).

2. The pellet in accordance with claim 1 wherein the method further comprises the step of conveying the substantially dry at least one pellet to a storage container.

3. The pellet in accordance with claim 1 wherein the step of conveying the at least one pellet in water to a separator comprises conveying the at least one pellet to a separator in water having a temperature of about 170° F. to about 200° F.

4. The pellet in accordance with claim 1 wherein the thermoset rubber particles comprise at least one of neoprene rubber particles and ethylene-propylene-diene monomer (EPDM) rubber particles.

5. The pellet in accordance with claim 1 wherein the pelletized plastic compound has a flex modulus of less than about 12,000 psi.

6. A method of pelletizing a plastic compound, said method comprising:

dispersing from about 30% to about 95% by weight of thermoset rubber particles into a carrier resin to form the plastic compound, the carrier resin comprising an olefin block copolymer, wherein the olefin block copolymer comprises an ethylene-1-octene block copolymer and is present in the plastic compound in an amount of from about 5% to about 70% by weight based on the total weight of the plastic compound;

extruding the plastic compound through a die having at least one die hole to form at least one extrudate filament;

cutting the at least one extrudate filament to a predetermined length to form a plurality of pellets;

conveying the pellets to a separator/centrifugal dryer in water having a temperature of about 170° F. or greater; and separating the pellets from the water in the separator/centrifugal dryer so that the pellets are substantially dry upon removal from the separator/centrifugal dryer, the pelletized plastic compound having a flex modulus of less than about 20,000 pounds per square inch (psi).

7. The method in accordance with claim 6 further comprising conveying the substantially dry pellets to a storage container.

8. The method in accordance with claim 6 wherein the water temperature is about 170° F. to about 200° F.

9. The method in accordance with claim 6 wherein the thermoset rubber particles comprise at least one of neoprene rubber particles and ethylene-propylene-diene monomer (EPDM) rubber particles.

10. The method in accordance with claim 6 wherein the pelletized plastic compound having a flex modulus of less than about 12,000 psi.

11. A pellet formed by a method comprising the steps of:

mixing from about 30% to about 95% by weight of thermoset rubber particles and a carrier resin together to form a plastic compound, weight percent based on the total weight of the plastic compound, the carrier resin comprising an olefin block copolymer, wherein the olefin block copolymer comprises an ethylene-1-octene block copolymer and is present in the plastic compound in an amount of from about 5% to about 70% by weight based on the total weight of the plastic compound;

directing the plastic compound into a pelletizer apparatus comprising a die and a knife blade;

extruding the plastic compound through the die to form an extrudate;

cutting the extrudate with the knife blade to form pellets of the plastic compound;

conveying the pellets to a separator/centrifugal dryer by a stream of water having a temperature of about 170° F. or greater; and separating the pellets from the water in the separator/centrifugal dryer, the pellets substantially dry upon removal from the separator/centrifugal dryer, the pelletized plastic compound having a flex modulus of less than about 20,000 pounds per square inch (psi).

12. The pellet in accordance with claim 11 wherein the method further comprises the step of conveying the substantially dry pellets to a storage container.

13. The pellet in accordance with claim 11 wherein the step of conveying the pellets to a separator comprises conveying the pellets to a separator by a stream of water having a temperature of about 170° F. to about 200° F.

14. The pellet in accordance with claim 11 wherein the thermoset rubber particles comprise at least one of neoprene rubber particles and ethylene-propylene-diene monomer (EPDM) rubber particles.

15. The pellet in accordance with claim 11 wherein the pelletized plastic compound has a flex modulus of less than about 12,000 psi.

16. A method of pelletizing a plastic compound, said method comprising:

mixing from about 30% to about 95% by weight of thermoset rubber particles and a carrier resin together to form a plastic compound, weight percent based on the total weight of the plastic compound, the carrier resin comprising an olefin block copolymer, wherein the olefin block copolymer comprises an ethylene-1-octene block copolymer and is present in the plastic compound in an amount of from about 5% to about 70% by weight based on the total weight of the plastic compound;

directing the plastic compound into a pelletizer apparatus comprising a die and a knife blade;

extruding the plastic compound through the die to form an extrudate;

cutting the extrudate with the knife blade to form pellets of the plastic compound;

conveying the pellets to a separator/centrifugal dryer by a stream of water having a temperature of about 170° F. or greater; and separating the pellets from the water in the separator/centrifugal dryer, the pellets substantially dry upon removal from the separator/centrifugal dryer, the pelletized plastic compound having a flex modulus of less than about 20,000 pounds per square inch (psi).

17. The method in accordance with claim 16 further comprising conveying the substantially dry pellets to a storage container.

18. The method in accordance with claim 16 wherein the water temperature is about 170° F. to about 200° F.

19. The method in accordance with claim 16 wherein the thermoset rubber particles comprise at least one of neoprene rubber particles and ethylene-propylene-diene monomer (EPDM) rubber particles.

20. The method in accordance with claim 16 wherein the pelletized plastic compound having a flex modulus of less than about 12,000 psi.

21. A pelletized plastic compound comprising:
   a carrier resin; and
   from about 30% to about 95% by weight of thermoset rubber particles dispersed into said carrier resin, weight percent based on the total weight of the plastic compound, said carrier resin comprising an olefin block copolymer, wherein said pelletized plastic compound has a flex modulus less than about 20,000 pounds per square inch (psi), and wherein the olefin block copolymer comprises an ethylene-1-octene block copolymer and is present in the plastic compound in an amount of from about 5% to about 70% by weight based on the total weight of the plastic compound.

22. The pelletized plastic compound in accordance with claim 21 wherein said thermoset rubber particles comprise at least one of neoprene rubber particles and ethylene-propylene-diene monomer (EPDM) rubber particles.

23. The pelletized plastic compound in accordance with claim 21 wherein said pelletized plastic compound has a flex modulus less than about 12,000 psi.

\* \* \* \* \*